June 4, 1957 J. C. COBERT 2,794,340
HOSIERY MEASURING AND INSPECTING DEVICE
Filed May 17, 1955 3 Sheets-Sheet 1
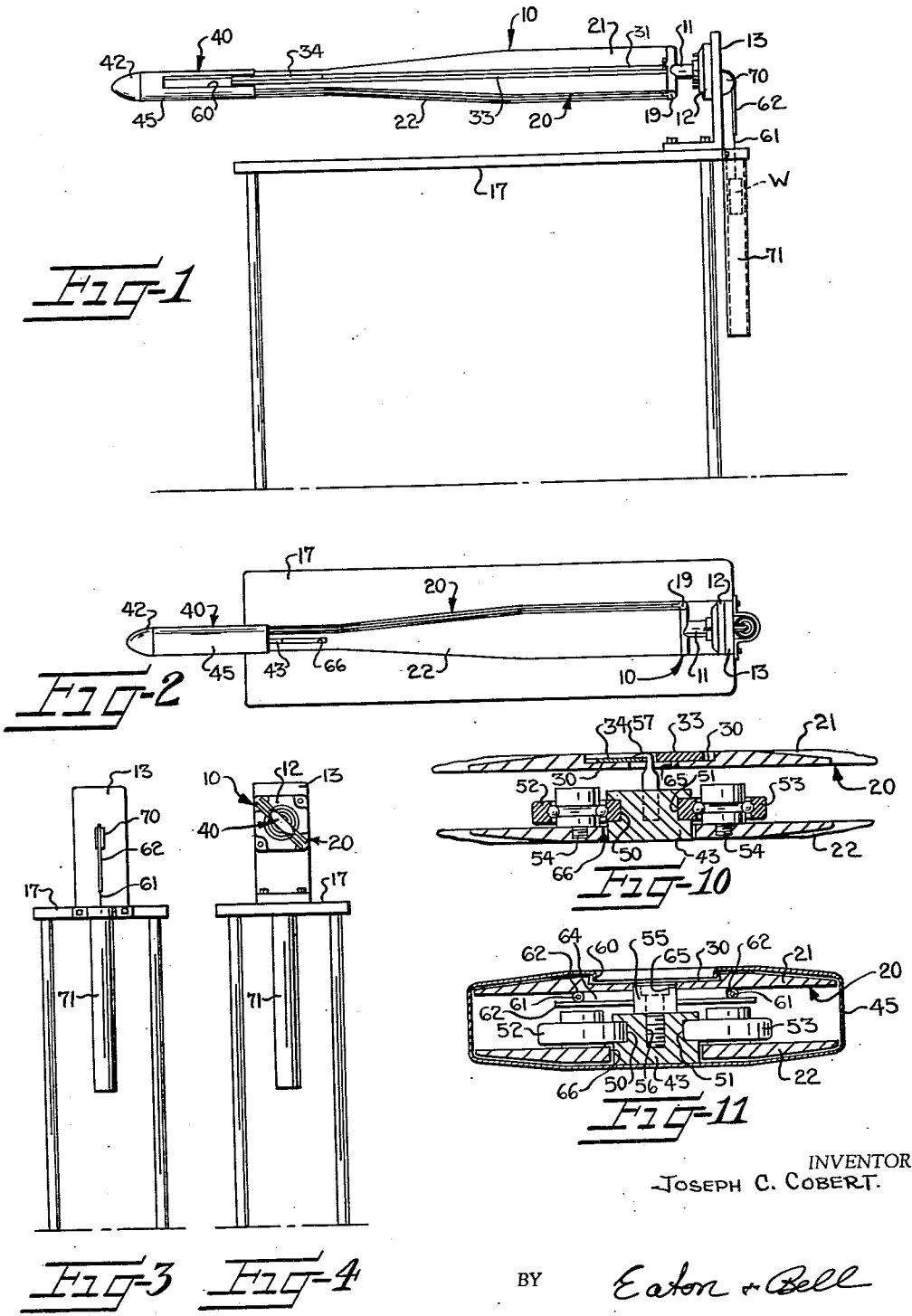
INVENTOR:
JOSEPH C. COBERT.
BY Eaton & Bell
ATTORNEYS June 4, 1957 J. C. COBERT 2,794,340
HOSIERY MEASURING AND INSPECTING DEVICE
Filed May 17, 1955 3 Sheets-Sheet 2
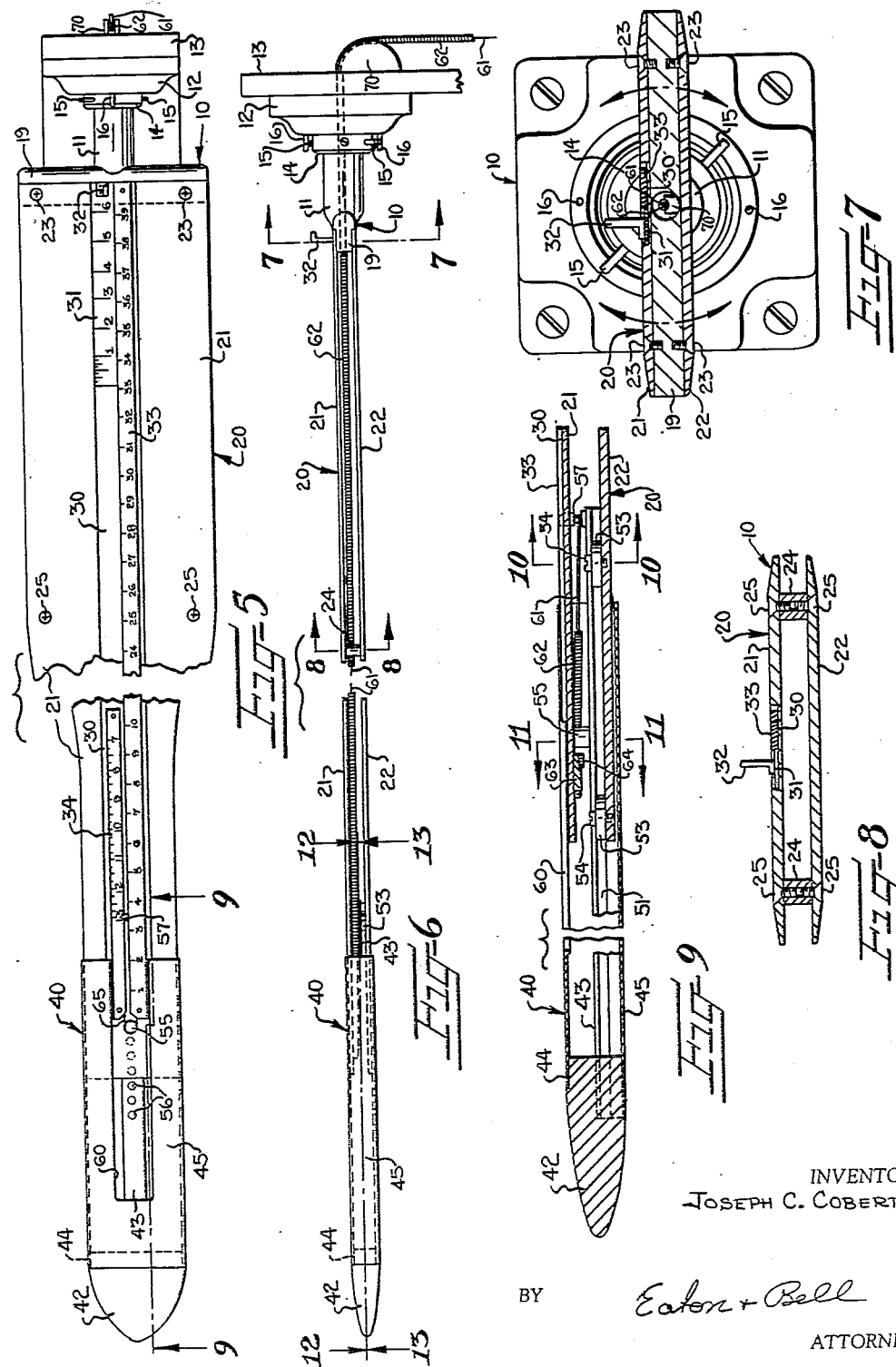
INVENTOR:
JOSEPH C. COBERT
BY Eaton + Bell
ATTORNEYS June 4, 1957   J. C. COBERT   2,794,340
HOSIERY MEASURING AND INSPECTING DEVICE
Filed May 17, 1955   3 Sheets-Sheet 3
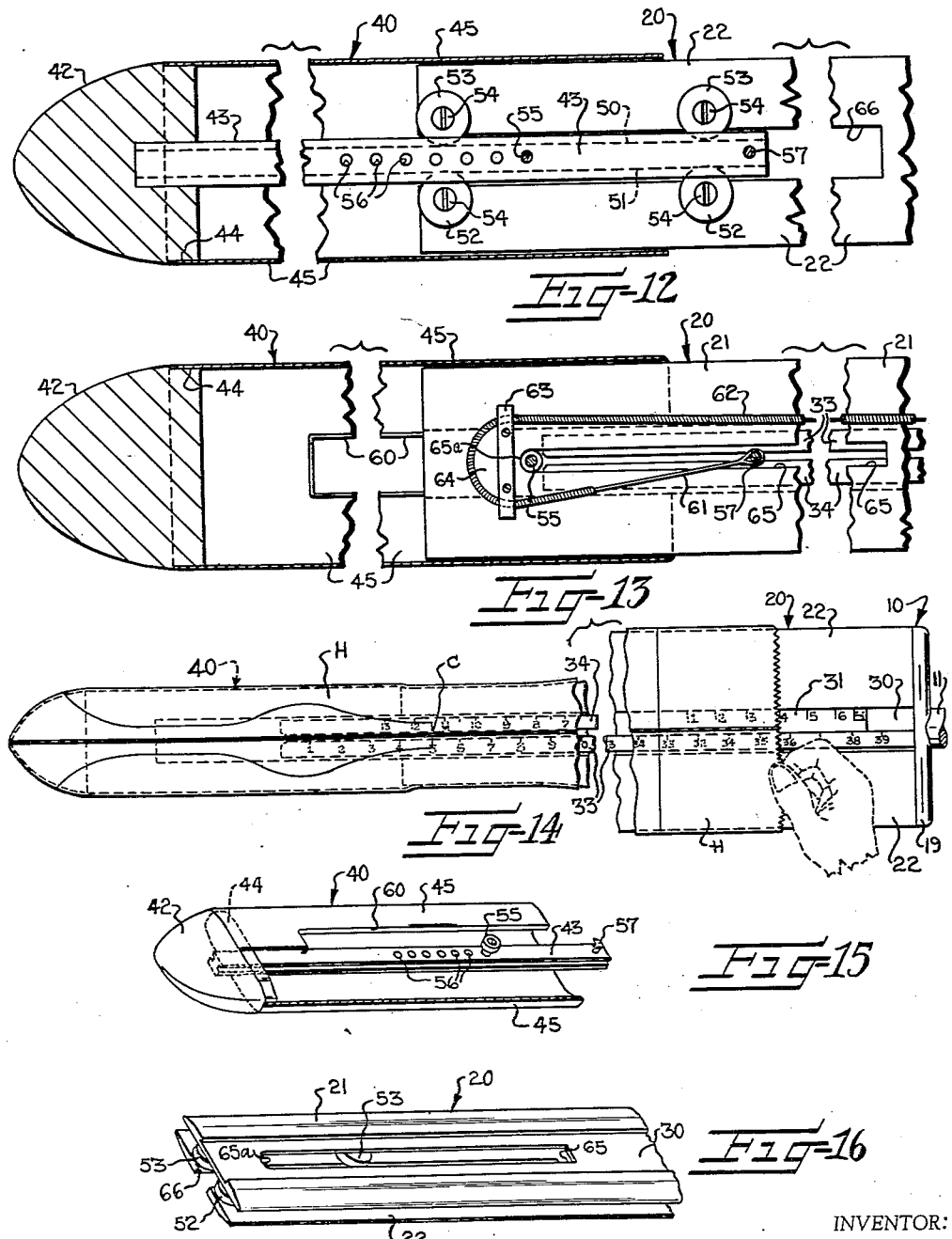
INVENTOR:
JOSEPH C. COBERT.
BY Eaton + Bell
ATTORNEYS United States Patent Office 2,794,340
Patented June 4, 1957

2,794,340

HOSIERY MEASURING AND INSPECTING DEVICE

Joseph C. Cobert, Concord, N. C.

Application May 17, 1955, Serial No. 508,974

12 Claims. (Cl. 73—159)

This invention relates to a hosiery testing and inspecting form especially designed to determine foot size, overall length, and welt or top measurement.

In the knitting of hosiery, particularly nylon hosiery, it is difficult to produce hose of uniform length and size. This difficulty is due mainly to the variable density of the yarn package and unevenness in denier or weight of the yarn causing a variable tension on the yarn in knitting. Yarn tension may also vary at certain knitting sections due to threading the yarn through special eyelets, or guides to prevent the yarn from contacting a knitting machine part in its normal path of travel.

Knitting machines can be and are carefully adjusted to produce hosiery of proper and uniform lengths, but in spite of these careful adjustments, considerable variation in hosiery length and size occurs because of changes in the above factors. Hence, during manufacture, samples of finished knitted hose frequently are measured for length and foot size to make sure that such measurements are within prescribed limits. If the length and foot size vary from such limits, the knitting machines are re-adjusted to bring the length and foot size of subsequently knitted hose back within the prescribed tolerances.

In testing the greige stockings on this invention, the distinct separation of heel-foot measurement from that of the leg eliminates a confusing result as presented in other testing devices, such as that covered by United States Patent No. 2,669,866 and No. 2,669,867 issued to M. N. Holmes on February 23, 1954. In using the Holmes device for testing stockings, any variation in heel length is reflected in overall length, therefore, a definite measurement of both stocking parts is not achieved. As a result, the machine adjuster must estimate the effect of variable heel length and overall length and this creates a variable due to the human element involved.

Therefore, it is an object of the invention to provide a hosiery measuring device on which separate and distinct measurements for the foot size, overall length, and welt or top measurement may be readily obtained.

Another object of the invention is to provide a hosiery measuring device having a telescopic foot member portion normally held in extended position under a predetermined pressure to accommodate the largest as well as the smallest size stockings without the need of other attachments. The principal advantage of the telescopic feature of the foot member is that it distinctly separates foot measurement from that of the leg length, thereby giving measurements that permit more accurate adjustments to be made on the knitting machine. This is achieved by using the reinforced heel portion of the stocking as the check point between foot size and length size. If the stocking is not reinforced with a splicing yarn, the heel gore in seamless hosiery, or the sole narrowing or other fashioning marks in the full fashioned stockings may be used as the check point.

A further object of the invention is to provide a hosiery measuring device wherein the telescopic foot portion of the device is adjustable to maintain a uniform extension of, for example, only two inches larger than the size of the hose to be tested so all hose of various sizes may be tested for measurement on this device under uniform conditions.

Some of the objects of the invention having been stated, other objects will appear as the description proceeds when taken in connection with the accompanying drawings, in which—

Figure 1 is a side elevation of the hosiery measuring device mounted on a table;

Figure 2 is a top plan view of Figure 1 with the hosiery measuring device rotated one hundred and eighty degrees from the position shown in Figure 1;

Figure 3 is a side elevation looking from the right side of Figure 1;

Figure 4 is a side elevation looking from the left side of Figure 1;

Figure 5 is a top plan view of the hosiery measuring device shown in Figure 1 on an enlarged scale;

Figure 6 is a side elevation of Figure 5;

Figure 7 is a vertical section on an enlarged scale taken along line 7—7 in Figure 6 and showing the mounting means for the hosiery size and length measuring device;

Figure 8 is a transverse sectional view on an enlarged scale taken along line 8—8 in Figure 6;

Figure 9 is a longitudinal sectional view on an enlarged scale taken along line 9—9 in Figure 5 and showing how the foot member portion is telescopically secured to the leg member portion of the measuring device;

Figure 10 is a transverse sectional view taken along line 10—10 in Figure 9 and showing how the rollers secured to the leg member of the device guide the support for the foot member;

Figure 11 is a transverse sectional view taken along line 11—11 in Figure 9 and showing how the stop screw for determining the outermost extended position of the foot member is carried by the foot member support;

Figure 12 is an enlarged longitudinal horizontal section taken on line 12—12 of Figure 6;

Figure 13 is a longitudinal horizontal section taken on line 13—13 of Figure 6 and showing the positioning of the cable in the device, which cable has a weight attached to one end for maintaining the foot member in extended position;

Figure 14 is a plan view similar to Figure 5 of the measuring device and showing a hose thereon to determine foot size, overall length and welt or top measurement thereof;

Figure 15 is an isometric view with parts broken away of the foot member;

Figure 16 is an isometric view of the outer end of the leg member with the measuring rulers removed for purposes of clarity and showing the portion of the leg member which will be telescopically received in the foot member.

Reference numeral 10 broadly indicates the hosiery measuring device mounted at one end by an arm or shaft 11 in a bearing 12 carried by a bracket 13 mounted on a table 17. As will be observed in Figure 6, the bearing 12 has an inner race 14 to which the end 11 is fixedly secured for movement in the bearing 12. The inner race 14 is provided with a pair of opposed projections or stop lugs 15 for engaging a pair of opposed or stop lug members 16 extending outwardly from the face of the bearing 12 to permit the measuring device 10 to be rotated one hundred and eighty degrees either direction. As will be observed in Figure 7, the members 15 and 16 are so positioned that the hosiery measuring device 10 will be prevented from making a complete revolution, but will always be stopped at substantially a forty-five degree angle with the table 17 so the hosiery may be more readily inspected for defects and the measurements readily read from the scales on the device.

A transverse member 19 is secured to the shaft 11, which member 19 has recessed portions in opposite surfaces thereof for receiving the leg member of the device broadly indicated at 20 which has opposed plate members or top and bottom members 21 and 22 fixedly secured into the recessed portions of the transverse member 19 by any suitable means such as screws 23. Spacer rollers 24 (Figures 5 and 8) are positioned between the top and bottom members 21 and 22 and are fixedly secured therein by screws 25 to maintain the members 21, 22 in spaced relation to each other. It will be observed from inspection of Figures 7, 8 and 16 that the plate or top and bottom members 21 and 22 are provided with smooth beveled edges to prevent engagement of a hose when being pulled onto the measuring form.

A groove 30 having an inwardly beveled edge is provided along the entire length of the top member 21 against which is received a slidable welt measuring scale or ruler 31 (Figures 5, 7 and 8) having corresponding beveled edges and a finger engaging portion 32 for readily moving or sliding the same in the groove 30. A stationary overall length measuring ruler or scale 33 having a beveled edge to cooperate with a beveled edge of the welt ruler 31 is securely positioned parallel with the welt measuring ruler 31 and extends slightly less than the entire length of the plate or top member 21 as will be observed in Figure 5. A stationary foot size scale or ruler 34 is securely positioned in parallel spaced relation to the length ruler 33 with its graduation marking or measuring numeral 13 (Figure 5) aligned with the marking three and one-half of the overall length ruler 33. It will be observed in Figure 7 that the welt measuring ruler 31 provided with beveled edges for engaging a beveled edge of the slot 30 and a develed edge of the ruler 33 is maintained within the confines of the slot 30 during its sliding movement.

A slidable foot member broadly indicated at 40 in Figure 15 telescopically receives the non-slidable leg member 20 during its movement. The foot member 40 has a cap member 42 for enclosing an end of an elongated guide rod or foot support 43 which is secured in the cap member 42. A sheet 45 of material, such as aluminum or plastic, is secured to a shoulder 44 on the cap 42 and surrounds portions of the guiding member 43 to present a smooth outer surface on the foot member 40.

Opposed slots 50 and 51 are provided in the side edges of the guide rod 43 (Figure 10) in which are received portions of pairs of spaced rollers 52 and 53 for guiding the guide rod 43 in its path of movement and for maintaining the same in proper alined position with the leg member 20. Suitable fastening means such as screws 54 are provided for securing the pairs of rollers 52 and 53 to the plate or bottom member 22 of the leg member 20.

A stop member 55 (Figure 15) having a plurality of adjustment holes 56 is provided on the guide rod 43 for predetermining the maximum extended position that the foot member 40 will assume when forced outwardly by means to be shortly explained. An indicator member 57 for indicating the foot size of the hose by cooperation with the ruler 34 is fixedly secured to the sliding member 43.

A slot 60 is provided in the medial top surface portion of the foot member 40 as shown in Figures 5 and 15 through which the indicator 57 on the guide rod 43 extends. It will be noted that the provision of this slot 60 enables the stop member 55 to be readily moved into one of the adjustment holes 56 provided on the guide rod 43. The sides of the sheet 45 which define the inner edges of the slot 60 are turned downwardly to ride along the edges of the slot 30 provided in the leg member 20 to also help maintain the foot member 40 in alined position with respect to the member 20 when the foot member 40 is slidably moved relative thereto.

A cable 61, preferably a steel cable coated with nylon to reduce friction, has one end secured to the shank of the indicator member 57 and is slidably received in a spirally wound cable 62, which cable 62 is secured in position by a plate or bracket member 63 and a half circular member 64 secured by suitable means such as screws to the inner surface of the top plate member 21 of the leg portion 20. The other end of the cable 61 passes over another half circular member 70 secured to the bracket 13 as shown in Figure 1 and a weight W, preferably three pounds, is connected to this end of the cable 61 which weight W is freely received in a guiding tube 71. Although a weight of three pounds is preferred, it may be varied with the type of hose being inspected and measured.

A slot 65 (Figures 10 and 16) is provided in the medial portion of the forward end of the plate member 21 of the leg portion 20 to permit the indicator 57 to extend therethrough and up between the proximal edges of the rulers 33 and 34 for indicating the foot size on the ruler 34. The outer edge 65a of the slot 65 acts as a stop for the stop member 55 on the foot supporting rod 43 to engage therewith to prevent the foot member 40 from completely disengaging the leg member 20.

A slot 66 having an open end is provided in the medial portion of the outer end of the plate member 22 between the side edges of which the guide rod 43 moves in its path of travel as shown in Figures 10 and 11.

Depending on which adjustment hole 56 the stop member 55 is positioned in will determine the maximum point of extension of the foot member 40. It will be observed in Figure 11 that the stop member 55 terminates below the slot 30 so the same may freely move below the rulers 33, 34 positioned in the slot 30.

It will be observed in Figures 5 and 14 that the foot size scale 34 is arranged with the numerals progressing lower in a direction away from the foot portion 40. Accordingly, the larger the foot size of the hose a smaller portion of the leg member 20 will be telescopically received in the foot portion 40 when the hose is measured. The setting or positioning of the foot size scale 34 on the leg portion 20 in the manner heretofore explained will therefore always give an accurate foot measurement.

*Operation of the device*

As shown in Figure 14, the hose H is pulled onto the measuring device 10 against the pressure exerted by the weight W to retract the foot member 40 over the end portion of the leg member 20 until a check point C on the hose is alined with a predetermined standard point, which in this case is the numeral five on the overall length scale 33. As soon as the check point C on the foot portion of the stocking reaches the numeral five on the overall length measuring ruler 33, the stretched stocking is held stationary and both the foot size and overall length is determined by a glance at the separate rulers. The welt measuring ruler 31 is then pushed under the top of the stocking so that a separate measurement of the welt portion of the stocking can quickly be made while the hose is still maintained under tension and while check point C is alined with the numeral five on the scale 33.

The top edge of the heel length used as the check point C in the illustration in Figure 14 is a predetermined point of a known measurement from the bottom of the heel and should result in a given foot size, overall length, and welt measurement if the knitting machine is properly adjusted and the yarn is properly conditioned.

If the stocking is not reinforced with a splicing yarn, instead of the check point C between foot size and leg length being the upper edge of the reinforced heel portion as illustrated in Figure 14, the heel gore in seamless hosiery, or the sole narrowing or other fashioning marks in the full fashioned stocking may be used as the check point. At any rate, the check point must be a point between foot size and leg length involving a separate adjustment of the knitting machine.

Once the scales have been read for the overall length, foot size and welt measurement, the device may be rotated one hundred and eighty degrees for inspecting the hose H on the other side against the plate surface 22. After the hose H is inspected, the operator releases the welt portion of the hose which he has been holding, at which time the hose H will begin to move off the end of the foot member 40 due to the release of the pressure being exerted by the weight W.

While a weight W has been disclosed to force the foot member 40 to an extended position and to maintain the hose being inspected in stretched condition, it is to be understood that coiled springs, air, hydraulic or other means may be employed.

Accordingly, a novel hosiery foot size, overall length and welt measuring device and method has been disclosed wherein the distinct separation of the heel-foot measurement from that of the leg completely eliminates the confusing results as presented in other testing devices heretofore.

In the drawings and specification there has been set forth a preferred embodiment of the invention, and although specific terms are employed, they are used in a generic and descriptive sense only, and not for purposes of limitation, the scope of the invention being defined in the claims.

I claim:

1. A hosiery measuring device comprising a leg portion, a foot portion slidable on the leg portion, means biasing said foot portion outwardly relative to said leg portion, scales provided on said leg portion for measuring the foot size, overall length, and welt of a hose and an indicator carried by said foot portion for cooperating with the foot size scale when a hose is pulled onto the device.

2. A measuring device for a hose comprising a leg portion, a foot portion slidable on the leg portion, means biasing said foot portion outwardly relative to said leg portion under a predetermined pressure, and means provided on said leg portion for indicating the hose size, overall length, and welt measurement when the hose is pulled onto the device in stretched condition.

3. A measuring device for a stocking comprising a horizontally disposed leg member, a horizontally disposed foot member slidably mounted on the leg member, means biasing said foot member in extended position relative to said leg member and for stretching a stocking positioned on said device, an indicator carried by said foot member, a foot scale on said leg member with which said indicator cooperates to indicate the foot size of the hose and length measuring indicia on said leg member.

4. A hosiery measuring device comprising a leg member, a foot member, means for slidably and resiliently urging said foot member in extended position relative to said leg member for applying stretch to a stocking positioned on said device, an indicator connected to said foot member, a foot measuring scale on said leg member with which said indicator cooperates to indicate the size of the hose and means on said leg member for measuring the overall length and welt portion of the stocking.

5. A measuring device for a stocking comprising a leg member, a foot member slidable on the leg member, means biasing said foot member in extended position relative to the leg member for applying stretch to a stocking positioned on said device, an indicator connected to said foot member, and a foot measuring scale on said leg member with which said indicator cooperates to indicate the size of the hose.

6. A hosiery measuring device comprising a leg portion, a foot portion slidable on the leg portion, foot size, overall length and welt measuring indicia on said leg portion of said form, and means for yieldably and slidably supporting said foot portion in extending position relative to said leg portion under a predetermined pressure whereby a hose placed on said form is measured in stretched condition under said predetermined pressure.

7. In a device according to claim 6 wherein means are provided for rotating the measuring device substantially a half revolution to facilitate the inspection of both sides of the hose being measured.

8. A device according to claim 6 wherein said means for yieldably supporting said foot portion in extended position relative to said leg portion comprises a guiding rod having one end connected to said foot portion and the other end slidably received in said leg portion, biasing means connected to said guiding rod for normally maintaining the rod in extended position, and means for adjusting the extended position of said foot portion.

9. A device according to claim 8 wherein said guiding rod is provided with opposed grooves along its side edges and at least one pair of rollers is carried by said leg portion for cooperating with the grooves in the guiding rod to maintain the foot portion in sliding alinement with the leg portion.

10. In a device according to claim 8 wherein said biasing means comprises a nylon covered cable, a spirally wound cable surrounding said nylon covered cable, one end of said nylon covered cable being secured to said guiding rod and the cable extending outwardly therefrom toward the foot portion, said cable being directed rearwardly from its outermost position, and a predetermined weight attached to the other end of said nylon cable.

11. A hosiery measuring device for measuring the foot size, overall length and welt of a hose comprising an elongated horizontally disposed leg member, a horizontally disposed foot member slidably mounted on the outer end of said leg member, means for yieldably and slidably urging said foot member in extended position relative to said leg member under a predetermined pressure, a foot size, overall length and welt scale on said leg member and an indicator carried by said foot member for cooperating with said foot size scale whereby a hose placed on said device can be measured while the hose is maintained in stretched condition.

12. A measuring device for a hose comprising a leg portion, a foot portion in alinement with the leg portion and slidable thereon, means biasing said foot portion outwardly relative to said leg portion to maintain a hose in stretched condition while being measured, an indicator carried by said foot portion, a foot size scale on said leg portion cooperating with said indicator to measure the foot size of the hose, and overall length and welt measuring indicia on said leg portion.

References Cited in the file of this patent

UNITED STATES PATENTS

| | | |
|---|---|---|
| 2,090,207 | Kliestrath | Aug. 17, 1937 |
| 2,205,648 | Fischer | June 25, 1940 |
| 2,669,866 | Holmes | Feb. 23, 1954 |
| 2,669,867 | Holmes | Feb. 23, 1954 |
| 2,712,755 | Meytre | July 12, 1955 |